(12) United States Patent
Henry et al.

(10) Patent No.: US 8,392,693 B2
(45) Date of Patent: Mar. 5, 2013

(54) FAST REP STOS USING GRABLINE OPERATIONS

(75) Inventors: G. Glenn Henry, Austin, TX (US); Colin Eddy, Austin, TX (US); Rodney E. Hooker, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 542 days.

(21) Appl. No.: 12/781,210

(22) Filed: May 17, 2010

(65) Prior Publication Data

US 2011/0055530 A1 Mar. 3, 2011

Related U.S. Application Data

(60) Provisional application No. 61/237,917, filed on Aug. 28, 2009.

(51) Int. Cl.
*G06F 7/38* (2006.01)
*G06F 9/00* (2006.01)
*G06F 9/44* (2006.01)
*G06F 15/00* (2006.01)

(52) U.S. Cl. ........................................ 712/220
(58) Field of Classification Search ........................ None
See application file for complete search history.

(56) References Cited

U.S. PATENT DOCUMENTS

| | | | | |
|---|---|---|---|---|
| 5,404,473 A | * | 4/1995 | Papworth et al. | 712/241 |
| 6,212,601 B1 | * | 4/2001 | Shiell | 711/118 |
| 6,212,629 B1 | * | 4/2001 | McFarland et al. | 712/241 |

* cited by examiner

*Primary Examiner* — Corey S Faherty
(74) *Attorney, Agent, or Firm* — E. Alan Davis; James W. Huffman

(57) ABSTRACT

A microprocessor includes a cache memory and a grabline instruction. The grabline instruction specifies a memory address that implicates a cache line of the memory. The grabline instruction instructs the microprocessor to initiate a zero-beat read-invalidate transaction on the bus to obtain ownership of the cache line. The microprocessor foregoes initiating the transaction on the bus when executing the grabline instruction if the microprocessor determines that a store to the cache line would cause an exception.

34 Claims, 4 Drawing Sheets

FAST REP STOS USING GRABLINE OPERATIONS

CROSS REFERENCE TO RELATED APPLICATION(S)

This application claims priority based on U.S. Provisional Application Ser. No. 61/237,917, filed Aug. 28, 2009, entitled FAST REP STOS USING GRABLINE OPERATIONS, which is hereby incorporated by reference in its entirety.

FIELD OF THE INVENTION

The present invention relates in general to the field of instruction set architectures in microprocessors, and particularly to instructions that store strings to memory.

BACKGROUND OF THE INVENTION

Programs commonly use the REP STOS instruction of the x86 instruction set architecture to scrub memory, e.g., to fill it with zeroes, or to write a large amount of the same data to a video buffer. The amount of data to write specified in ECX may be relatively large such that many cache lines and even many pages of memory are written. The goal is for the processor to do this as fast as possible. Typically, the memory being written has a write-back memory trait, meaning it is writeable and cacheable. If the store area (i.e., the area of memory being written) is already in cache, the REP STOS will go much faster than if the store area is missing in the cache. This is because the processor must allocate missing cache lines, i.e., gain ownership of the cache lines and read them in from memory into the cache, which is very relatively time consuming.

BRIEF SUMMARY OF INVENTION

In one aspect the present invention provides a microprocessor operatively coupled via a bus to a memory. The microprocessor includes a cache memory and a grabline instruction. The grabline instruction specifies a memory address that implicates a cache line of the memory. The grabline instruction instructs the microprocessor to initiate a zero-beat read-invalidate transaction on the bus to obtain ownership of the cache line. The microprocessor foregoes initiating the transaction on the bus when executing the grabline instruction if the microprocessor determines that a store to the cache line would cause an exception.

In another aspect, the present invention provides a method to be performed by a microprocessor operatively coupled via a bus to a memory. The method includes receiving a grabline instruction for execution. The grabline instruction specifies a memory address that implicates a cache line of the memory. The method also includes determining whether a store to the cache line would cause an exception, in response to the receiving the grabline instruction for execution. The method also includes initiating a zero-beat read-invalidate transaction on the bus to obtain ownership of the cache line if a store to the cache line would not cause an exception and foregoing initiating the transaction on the bus if a store to the cache line would cause an exception.

In yet another aspect, the present invention provides a computer program product for use with a computing device, the computer program product comprising a computer usable storage medium having computer readable program code embodied in the medium for specifying a microprocessor operatively coupled via a bus to a memory. The computer readable program code includes first program code for specifying a cache memory and second program code for specifying a grabline instruction that specifies a memory address that implicates a cache line of the memory. The grabline instruction instructs the microprocessor to initiate a zero-beat read-invalidate transaction on the bus to obtain ownership of the cache line. The microprocessor is configured to forego initiating the transaction on the bus when executing the grabline instruction if the microprocessor determines that a store to the cache line would cause an exception.

DETAILED DESCRIPTION OF THE INVENTION

One way to speed up REP STOS (also referred to herein as repeat string stores) is to allocate the cache lines of the store area ahead of the actual stores of the data to the cache lines. However, the present inventors recognize that for each entire cache line implicated by a long store string the cache line data from system memory is not needed because the processor is going to store to the entire cache line. So, rather than doing a normal bus cycle to obtain exclusive ownership of the cache line, the microprocessor 100 (of FIG. 1) does zero-beat read-invalidate transactions on the processor bus 134 (of FIG. 1), which are faster since they do not have data cycles and do not require actual accesses to the memory. Again, the microprocessor 100 can only allocate cache lines in this manner for which it knows it will be writing the entire cache line with data from the REP STOS. The microprocessor 100 attempts to do these zero-beat read-invalidate transactions far enough ahead of the actual store operations such that the cache line is owned by the time the stores arrive at the data cache 124 (of FIG. 1).

However, obtaining ownership of a cache line without having the data from memory has the potential for data corruption and/or processor hangs, so these problems must be solved in order to take advantage of the read-invalidate transactions, as discussed below. For example, since the microprocessor 100 will only have ownership of the cache line but will not have the actual data of the cache line, it cannot do a read-invalidate transaction unless it knows it is going to store to the entire cache line.

For another example, the REP STOS instruction has an architectural requirement that it is supposed to be executed as a loop of individual STOS instructions. Thus, if an individual STOS causes an exception, the architectural state must reflect where the exception occurred. Specifically, ECX must reflect how many iterations of the loop are left to execute and EDI must reflect the address of the memory location that caused the exception. This greatly complicates the use of the large stores and read-invalidate transactions.

Figure 1:
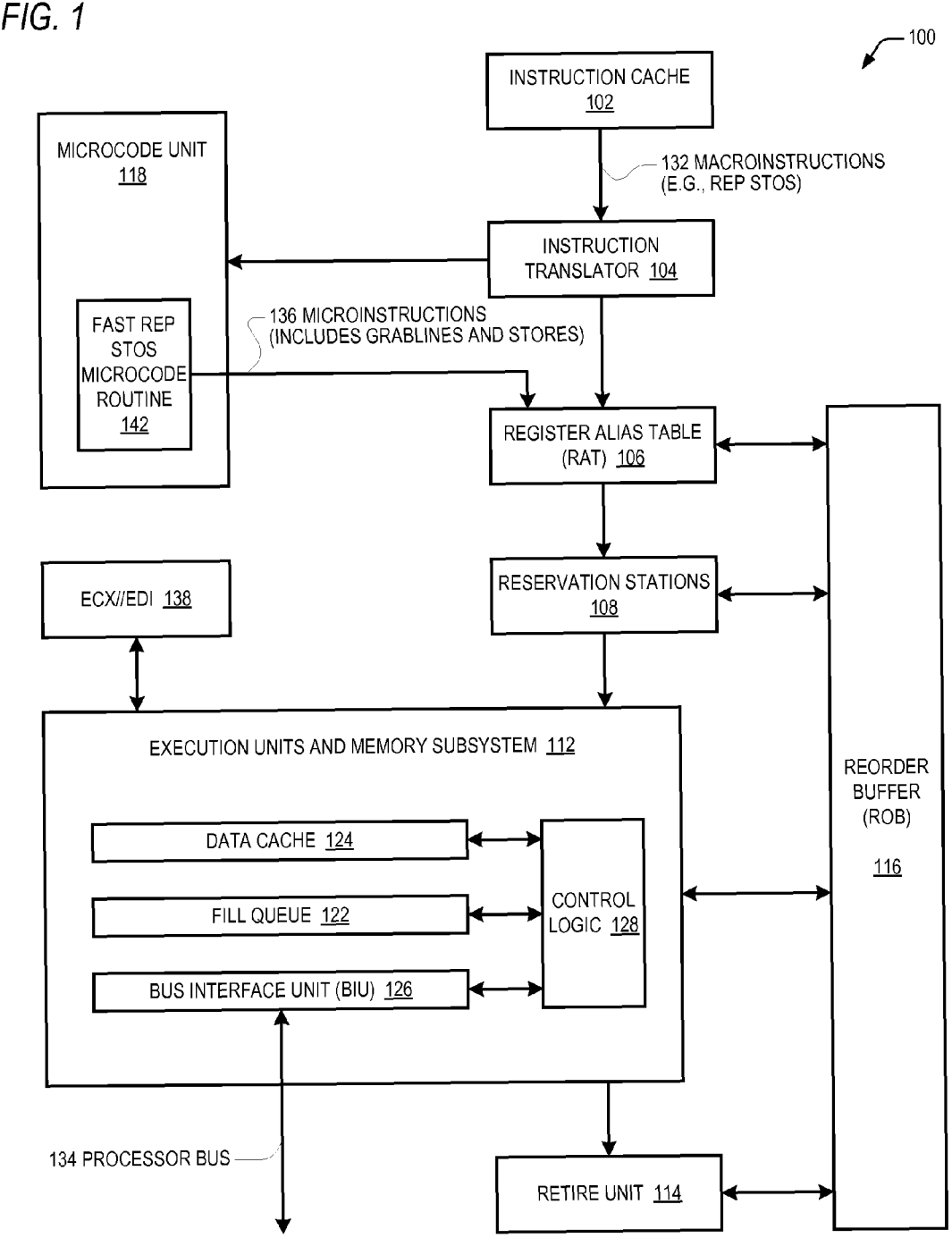
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 102 for caching program instructions, such as an x86 REP STOS instruction, also referred to as a macroinstruction 132. The microprocessor 100 also includes an instruction translator 104 that translates macroinstructions 132 into microinstructions for execution by execution units 112 of the microprocessor 100. When the instruction translator 104 encounters certain complex macroinstructions 132, such as a REP STOS, the instruction translator 104 traps to a microcode unit 118.

The microcode unit 118 includes a microcode ROM (not shown) that stores microcode routines, comprising microinstructions 136, which implement macroinstructions 132. In particular, the microcode ROM includes a fast microcode routine 142 for implementing the REP STOS macroinstruction 132. The microcode routine 142 includes conventional store instructions to store the data specified by a REP STOS. The microcode ROM also includes a routine (not shown) for implementing the REP STOS instruction in a conventional fashion, i.e., without using grabline operations (described below) and without using larger store operations than specified by the REP STOS. The fast microcode routine 142 also includes a special microinstruction 136, referred to as a grabline operation, which instructs a memory subsystem 112 of the microprocessor 100 to instruct a bus interface unit 126 of the microprocessor 100 to obtain ownership of a cache line implicated by the memory address specified by the grabline operation by doing a zero-beat read-invalidate transaction on the bus 134, which is discussed in more detail below.

The microprocessor 100 also includes a register alias table (RAT) 106 that receives the microinstructions from the instruction translator 104 and microcode unit 118 in program order, generates instruction dependency information, and dispatches the instructions to reservation stations 108. The reservation stations 108 issue the instructions to execution units 112 of the microprocessor 100 when they are ready for execution. Registers 138, including architectural and temporary registers of the microprocessor 100, provide operands to the execution units 112 along with the instructions. In particular, the registers 138 include the ECX and EDI registers used by the REP STOS instruction.

The execution units and memory subsystem 112 include units commonly found in a microprocessor, such as integer units, floating-point units, SIMD units, load/store units, and branch units (not shown). The memory subsystem 112 includes the data cache 124, a fill queue 122, the bus interface unit 126, and control logic 128. The fill queue 122 includes a plurality of entries for holding cache lines received from system memory for allocation into the data cache 124. Operation of the memory subsystem 112 is discussed in more detail below.

The microprocessor 100 also includes a retire unit 114 that retires instructions in program order as indicated by their location within a reorder buffer (ROB) 116 of the microprocessor 100.

Figure 2:
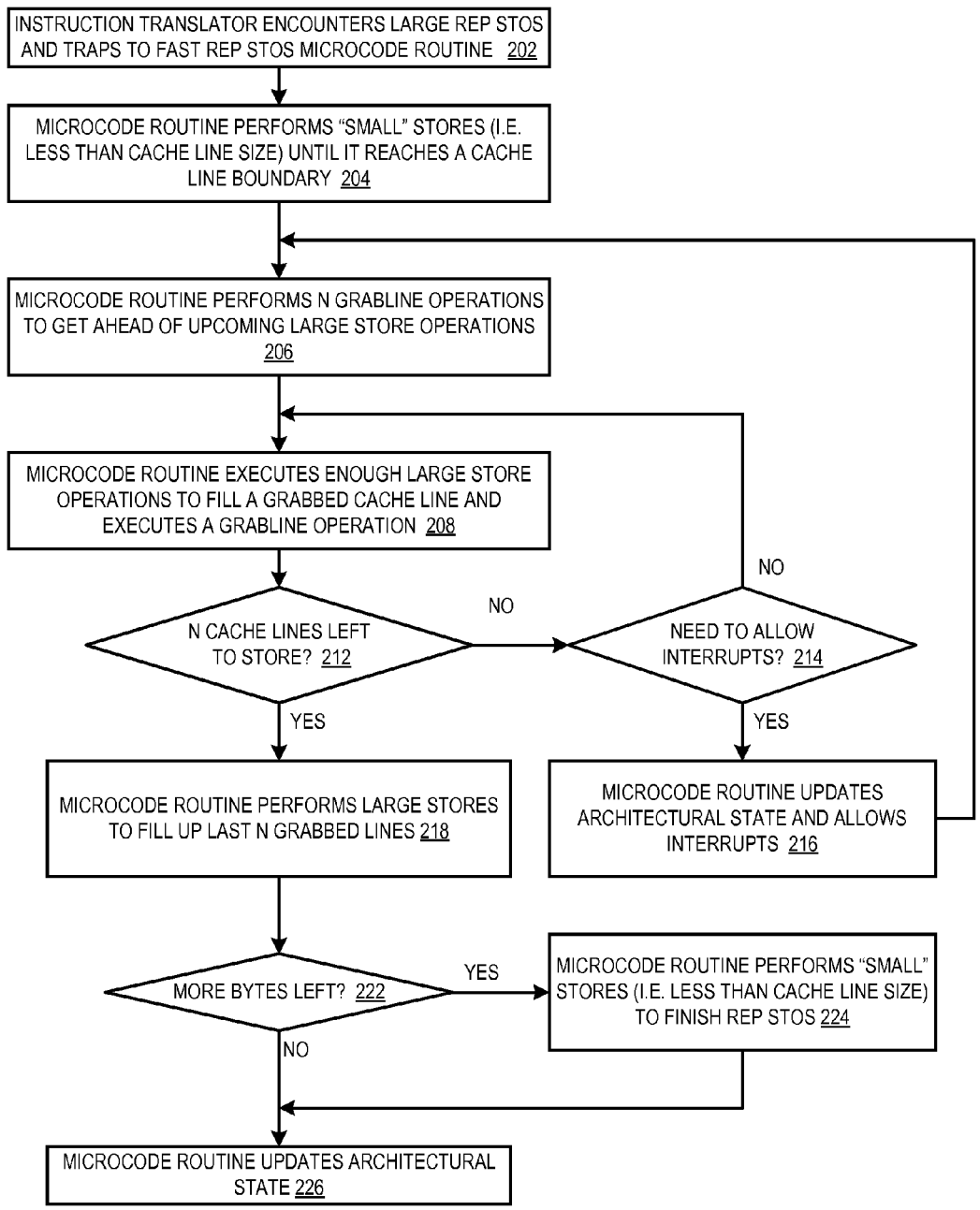
FIG. 2 is a flowchart illustrating operation of the microprocessor of FIG. 1.

Referring now to FIG. 2, a flowchart illustrating operation of the microprocessor 100 of FIG. 1 is shown. Flow begins at block 202.

At block 202, the instruction translator 104 encounters a large REP STOS instruction and traps to the fast REP STOS microcode routine 142. In one embodiment, a "large" REP STOS is one in which the value of ECX is greater than or equal to 128. In one embodiment, the trap to the microcode routine 142 disables the microprocessor 100 from taking interrupts until the microcode routine 142 explicitly allows interrupts to be taken. In one embodiment, the microcode routine 142 includes a special micro-operation that enables interrupts to be taken during execution of the micro-operation and a special micro-operation that disables interrupts from being taken during execution of the micro-operation. Flow proceeds to block 204.

At block 204, the microcode routine 142 performs small store operations at the initial memory address specified by the REP STOS instruction until it reaches a cache line boundary. The region associated with the small stores leading up to the cache line boundary is referred to herein as the "head." The small stores are byte, word, dword, and so forth up to a half-cache line size stores. In one embodiment, a cache line is 64 bytes. Flow proceeds to block 206.

At block 206, the microcode routine 142 performs N grabline operations in order to get ahead of corresponding stores that will fill in the grabbed cache lines. In one embodiment, N is six, which is slightly less than the total number of fill queue 122 entries. The grabline operations instruct the memory subsystem 112 to request the bus interface unit 126 to perform a read-invalidate transaction on the processor bus 134 for an entire cache line implicated by the memory address specified by the grabline operation. Advantageously, the read-invalidate transaction on the processor bus 134 (also referred to as a zero-beat read) does not cause an access to system memory and does not include a data transfer phase on the bus 134. Advantageously, this is more efficient on the bus 134 than a store operation that misses in the data cache 124 and causes a cache line fill, which requires a transaction on the bus 134 and an access to system memory to read the cache line. However, this requires the microprocessor 100 to ensure that it fills up the cache line with valid data, since the valid data from the system memory was not read into the microprocessor 100. In particular, the microprocessor 100 must ensure that exceptions and interrupts do not prevent filling of each grabbed cache line. Additionally, each grabline operation is executed well in advance of the store operations that will fill the cache line so that the time required on the processor bus 134 to perform the zero-beat read transaction on the bus 134 associated with the grabline operation may overlap with the execution of other instructions that are between the grabline and the corresponding stores. That is, the microcode routine 142 is designed such that the grabline operation sufficiently precedes its associated store operations to create a high likelihood that by the time the associated store operations are executed by the memory subsystem 112, the read-invalidate transaction on the bus 134 will have already been performed such that ownership of the cache line implicated by the associated stores will have already been obtained, so that the associated store operations will hit in the data cache 124. In one embodiment, the bus interface unit 126 performs the read-invalidate transaction immediately; that is, the read-invalidate transaction may be performed before the grabline operation is retired by the retire unit 114. Additionally, a flush of the microprocessor 100 pipeline, such as in response to a determination that a branch instruction was mispredicted or a load operation missed in the data cache 124, does not kill a speculatively executed grabline operation. Therefore, in order to avoid not being able to fill a grabbed cache line, the microcode routine 142 is designed to ensure that a grabline operation is never speculatively executed. Flow proceeds to block 208.

At block 208, the microcode routine 142 performs enough large stores to fill in a cache line (e.g., four 16-byte stores) and performs a grabline operation. A "large" store is a store that is larger than the size specified by the individual byte, word, or dword STOS of the REP STOS. In one embodiment, a large store is 16 bytes. It is noted that the stores performed at a given instantiation of block 208 will not fill in the cache line grabbed by the grabline operation performed at the same instantiation of block 208; rather, they will fill in a cache line grabbed by the grabline operation performed by a previous instantiation of block 208. Flow proceeds to decision block 212.

At decision block 212, the microcode routine 142 determines whether there are N cache lines left to store to satisfy the REP STOS instruction, where N is the number of cache lines that were pre-grabbed at block 206. If so, flow proceeds to block 218; otherwise, flow proceeds to decision block 214.

At decision block 214, the microcode routine 142 determines whether it needs to allow interrupts. Architecturally, REP STOS instructions must allow interrupts during their execution. In one embodiment, to satisfy this architectural requirement, the microcode routine 142 allows interrupts each time 64 cache lines of data have been written. In one embodiment, the loop illustrated in the flowchart via blocks 208/212/214 is unrolled within the microcode routine 142 to improve performance. If it is time to allow interrupts, flow proceeds to block 216; otherwise, flow loops back to block 208.

At block 216, the microcode routine 142 updates the architectural state of the microprocessor 100 to reflect how many STOS iterations of the REP STOS it has performed. In particular, the microcode routine 142 updates the ECX and EDI values to satisfy the architectural requirement mentioned above. As with exceptions, upon the taking of an interrupt, the architectural state must reflect where the microprocessor 100 was in the execution of the REP STOS when the interrupt occurred. Unless interrupts are handled carefully, i.e., allowed only at controlled times, they could cause incorrect architectural state and/or hangs associated with not being able to fill a cache line whose ownership was obtained via a zero-beat read-invalidate transaction. After allowing a brief window for interrupts to occur, interrupts are disabled again and flow loops back to block 206 to perform more pre-grabline operations.

At block 218, the microcode routine 142 performs large store operations to fill up the last N cache lines that were grabbed by grabline operations at blocks 206 and/or 208. Flow proceeds to decision block 222.

At decision block 222, the microcode routine 142 determines whether there are more bytes of the REP STOS left to store. If so, flow proceeds to block 224; otherwise, flow proceeds to block 226.

At block 224, the microcode routine 142 performs small stores to finish storing the last bytes of the REP STOS instruction. The region associated with the small stores after the last full cache line is referred to herein as the "tail." Flow proceeds to block 226.

At block 226, the microcode routine 142 updates the architectural state (ECX/EDI) to reflect completion of the REP STOS instruction. Flow ends at block 226.

Figure 3A:
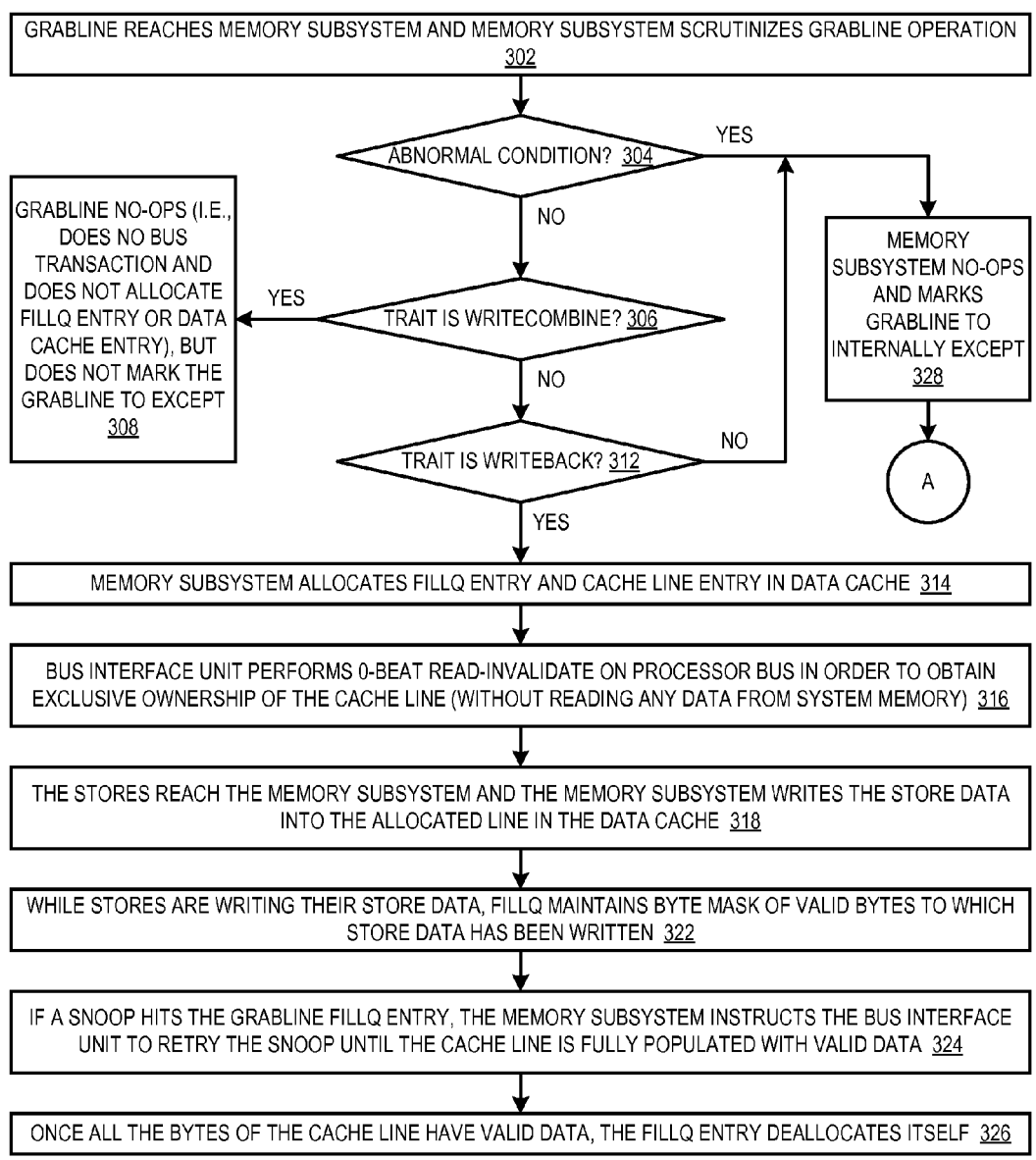
FIG. 3 is a flowchart illustrating operation of the microprocessor of FIG. 1.
Figure 3B:
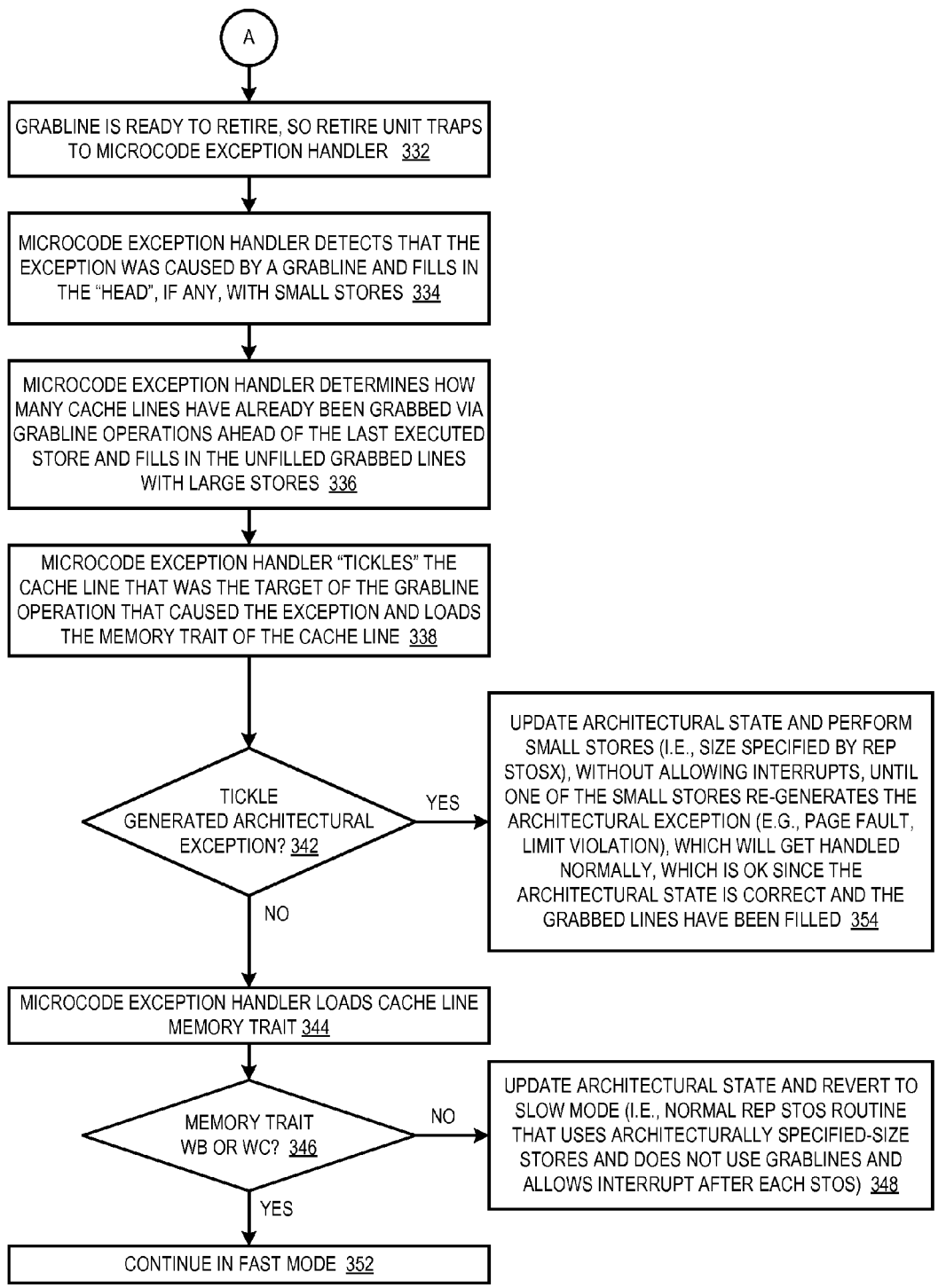

Referring now to FIG. 3, a flowchart illustrating operation of the microprocessor 100 of FIG. 1 is shown. Flow begins at block 302.

At block 302, a grabline operation (such as performed at block 206 or 208 of FIG. 2) reaches the memory subsystem 112, which examines the grabline operation. In one embodiment, the memory address specified by the grabline operation performed at block 206 or 208 specifies a memory location that is at or near the end of the cache line in order to enable the memory subsystem 112 to perform various exception condition checks that might occur at or near the end of the cache line but not nearer the beginning of the cache line, such as segment limit violations or breakpoints. Flow proceeds to decision block 304.

At decision block 304, the memory subsystem 112 determines whether an abnormal condition exists with respect to the grabline operation. An abnormal condition may include, but is not limited to, the following: a segment limit violation anywhere within the cache line specified by the grabline operation; a page fault on the memory page that includes the cache line; a debug breakpoint; the memory trait of the cache line is unknown (e.g., a TLB miss); the page is not useable by a store (i.e., a page table walk has not yet been performed to indicate that the page is dirty); the memory trait of the cache line is other than write-back (WB) or write-combine (WC). Because the memory subsystem 112 hardware checks for these conditions, if no abnormal condition exists (and the memory trait is WB), the microcode routine 142 is advantageously able to continue on at full speed with the grabline operations preceding the corresponding large stores, even across a page boundary. If an abnormal condition exists, flow proceeds to block 328; otherwise, flow proceeds to decision block 306.

At decision block 306, the memory subsystem 112 determines whether the memory trait for the cache line is write-combine. If so, flow proceeds to block 308; otherwise, flow proceeds to decision block 312.

At block 308, the memory subsystem 112 no-ops the grabline operation. That is, the memory subsystem 112 does not perform the read-invalidate transaction (such as at block 316) and does not allocate an entry in the data cache 124 or fill queue 122 (such as at block 314). Additionally, the memory subsystem 112 does not mark the grabline operation to except (such as at block 328). Consequently, subsequent large stores performed at blocks 208 and 218 are issued and go to the write combine buffer (not shown) of the microprocessor 100, and subsequent grabline operations also no-op and do not except. Thus, the REP STOS to a WC region of memory may enjoy the performance benefit of the large stores even if it does not enjoy the benefit of the grablines. Flow ends at block 308.

At decision block 312, the memory subsystem 112 determines whether the memory trait for the cache line is write-back. If so, flow proceeds to block 314; otherwise, flow proceeds to decision block 328.

At block 314, the memory subsystem 112 allocates an entry in the data cache 124 and a fill queue 122 entry for the grabbed cache line. Flow proceeds to block 316.

At block 316, the bus interface unit 126 performs a zero-beat read-invalidate transaction on the bus 134 in order to obtain exclusive ownership of the cache line without reading any data from the system memory. Flow proceeds to block 318.

At block 318, the stores performed at block 208 or 218 of FIG. 2 reach the memory subsystem 112 and the memory subsystem 112 writes the store data into the allocated line in the data cache 124. Flow proceeds to block 322.

At block 322, while the store data of block 318 is being written into the data cache 124, the fill queue 122 entry maintains a byte mask of valid bytes to which the store data has been written. The byte mask identifies which bytes are valid for subsequent loads that hit the cache line. Flow proceeds to block 324.

At block 324, if a snoop hits the fill queue 122 entry associated with the grabline operation, the bus interface unit 126 retries the snoop until the cache line is fully populated with valid data from the stores. Flow proceeds to block 326.

At block 326, once all the bytes of the cache line have been filled with valid data, the fill queue 122 entry deallocates itself, which results in the cache line subsequently being retired to the data cache 124. Flow ends at block 326.

At block 328, the memory subsystem 112 no-ops the grabline operation. That is, the memory subsystem 112 does not perform the read-invalidate transaction (such as at block 316) and does not allocate an entry in the data cache 124 or fill queue 122 (such as at block 314). However, the memory subsystem 112 marks the grabline operation to except. Consequently, instructions that are newer in program order than the abnormal grabline are flushed, such as newer large stores performed at blocks 208 and 218 and newer grabline operations performed at blocks 206 and 208. In particular, the memory subsystem 112 marks the abnormal grabline to except internally, rather than architecturally, as discussed more below with respect to blocks 332 to 348. Flow proceeds to block 332.

At block 332, the grabline operation is ready to retire and the retire unit 114 detects that the grabline operation is marked to except, so the retire unit 114 flushes all instructions newer than the excepting grabline operation and traps to an exception handler in the fast REP STOS microcode routine 142. In one embodiment, the memory subsystem 112 sets a bit to indicate that a grabline operation caused the internal exception, and the microcode routine 142 reads the bit to detect this condition. Flow proceeds to block 334.

At block 334, the microcode exception handler detects that the exception was caused by a grabline operation and fills any remaining portion of the "head," if any, with small store operations. In one embodiment, the grabline operations performed at block 206 of FIG. 2 actually precede in program order the small stores performed at block 204. Thus, one of the block 206 grablines may except before the head has been completely filled. Flow proceeds to block 336.

At block 336, the microcode exception handler determines how many cache lines have already been grabbed by grabline operations ahead of the last executed store, i.e., how many unfilled cache lines are present. The microcode exception handler then fills in the unfilled cache lines by performing large store operations, similar to those of block 208. As discussed above, the memory subsystem 112 and microcode routine 142 always ensure that no architectural exception or interrupt is generated (i.e., control is not transferred to the operating system) until the architectural state is correct and every cache line grabbed by a grabline operation is filled. Flow proceeds to block 338.

At block 338, the microcode exception handler "tickles" the cache line that was the target of the grabline operation that caused the internal exception. That is, the microcode exception handler performs an instruction that instructs the memory subsystem 112 to essentially perform the functions associated with a store operation without actually writing the store data to memory. In particular, the memory subsystem 112 performs all the exception checks that must be performed on a store operation. For example, the exception checks may include, but are not limited to, the following: a segment limit violation; a page fault; a debug breakpoint; the cache line is non-writeable. The tickle instruction will perform a page table walk if necessary to obtain the page table information, which includes the memory trait information, associated with the cache line. Flow proceeds to decision block 342.

At decision block 342, the memory subsystem 112 determines whether the tickle performed at block 338 caused an architectural exception condition. If so, flow proceeds to block 354; otherwise, flow proceeds to block 344.

At block 344, the microcode exception handler loads the trait of the cache line. Flow proceeds to decision block 346.

At decision block 346, the microcode exception handler examines the loaded memory trait. If the memory trait is either write-back or write-combine, flow proceeds to block 352; otherwise, flow proceeds to block 348.

At block 348, the microcode exception handler updates the architectural state (i.e., ECX/EDI) to reflect the last retired store operation, clears the exception, and reverts to slow string store mode. That is, the microcode exception handler transfers control to the microcode routine (not shown) in the microcode unit 118 that performs REP STOS instructions normally, i.e., in a loop of STOS operations that are the size specified by the REP STOS instruction (i.e., byte, word, or dword, as opposed to large stores) and without using grabline operations and allows interrupts after each STOS operation. Advantageously, the checks at decision blocks 304 and 346 allow the microprocessor 100 to perform fast string stores while avoiding violations of the architectural requirement to perform writes on the bus 134 that are the size specified by the original REP STOS instruction and by avoiding violating the architectural requirement to perform writes on the bus 134 without caching the data to memory regions that have a non-cacheable trait. For example, a memory-mapped I/O device might be mapped to a location within a memory region with a non-cacheable trait because (1) the programmer really wants the store to go out onto the bus rather than to cache, and (2) the programmer really wants the I/O device to be written with the size store specified by the program (e.g., byte-sized writes to a byte-sized control register on the I/O device) rather than a large store. Thus, if a REP STOS transitions from a cacheable region (within which it is permitted to do large stores) to a non-cacheable region (within which it is not permitted to do large stores), the microprocessor 100 described herein advantageously stops doing cached/large writes and does non-cached/small writes. Flow ends at block 348.

At block 352, the microcode exception handler continues in fast string store mode. That is, flow returns to block 206 of FIG. 2. Flow ends at block 352.

At block 354, the architectural exception causes flow to be transferred to another exception handler within the microcode routine 142 that updates the architectural state, clears the exception condition, and performs small stores similar to the ones performed by the slow string store code at block 348 until one of the small stores re-causes the architectural exception caused by the tickle. In particular, this exception handler does not allow interrupts in order to guarantee that it is allowed to store data to the memory region between the beginning of the cache line that caused the tickle to except and the location within the cache line that actually caused the exception, which may be farther into the cache line than the beginning. When the architectural exception handler is invoked in response to the small store, it will handle the architectural exception normally, which is acceptable since the microcode exception handler previously updated the architectural state and any outstanding grabbed lines have been filled. Flow ends at block 354.

As may be seen from FIG. 3, and as discussed above, in order to receive a performance benefit from them, the grabline operations are performed on the bus 134 well in advance of where the stores are architecturally, i.e., well in advance of the stores that are actually retiring. Advantageously, if the memory subsystem 112 detects that a grabline would cause an abnormal condition (such as an exception or other conditions specified above), then the memory subsystem 112 causes the grabline to generate an internal exception that enables the microcode exception handler to determine that it was a grabline that caused the exception so that the exception handler can go off to special grabline handling code. The memory subsystem 112 generates the internal exception rather than an architectural exception in order to enable the outstanding grablines to be filled with stores, such as at block 336. Otherwise, a machine hang might occur. Thus, if the entire large REP STOS is to a WB memory region, and in the absence of an abnormal condition, the embodiments of the microprocessor 100 described herein may advantageously store the entire string specified by the REP STOS (except perhaps the head and tail portions, if any) at effectively the maximum rate that the processor bus 134 and memory subsystem can accommodate by employing the grablines and large stores and need not slow down through the entire string length.

Although an embodiment has been described in which the grabline operations are used to perform fast string stores (REP STOS), other embodiments are contemplated that use the grabline operations to perform fast string moves (REP MOVS), i.e., to speed up the performance of a REP MOVS by performing grabline operations sufficiently ahead of the stores associated with the MOVS operations to cause them to hit in the cache when they are executed.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, operatively coupled via a bus to a memory, the microprocessor comprising:
   a cache memory; and
   a grabline instruction, that specifies a memory address that implicates a cache line of the memory, wherein the grabline instruction instructs the microprocessor to initiate a zero-beat read-invalidate transaction on the bus to obtain ownership of the cache line;
   wherein the microprocessor is configured to forego initiating the transaction on the bus when executing the grabline instruction if the microprocessor determines that a store to the cache line would cause an exception.

2. The microprocessor of claim 1, further comprising:
   microcode, configured to implement an architectural instruction that instructs the microprocessor to repeatedly store a string to adjacent locations in the memory specified by the architectural instruction, wherein the adjacent locations in the memory collectively include a plurality of cache lines, wherein the microcode includes grabline instructions that specify memory addresses that implicate the plurality of cache lines, wherein the microcode also includes store instructions that fill the plurality of cache lines with the string.

3. The microprocessor of claim 2, wherein the microcode is further configured to detect a condition in which the microprocessor flushed before retiring one or more of the store instructions such that one or more of the plurality of cache lines for which ownership was obtained by the microprocessor via the zero-beat read-invalidate bus transaction was not filled with the string by the flushed store instructions.

4. The microprocessor of claim 3, wherein the microcode is further configured to fill with the string the one or more of the plurality of cache lines that were not filled with the string by the flushed store instructions, in response to detecting the condition.

5. The microprocessor of claim 4, wherein the microcode is further configured to store the string to a head portion of the adjacent locations in the memory specified by the architectural instruction, in response to detecting the condition, wherein the head portion comprises locations in the memory from the first location specified by the architectural instruction up to but not including the first of the plurality of cache lines.

6. The microprocessor of claim 3, wherein the microprocessor flushed the one or more of the store instructions in response to one of the grabline instructions indicating that a store to one of the plurality of cache lines would cause an exception, wherein the flushed store instructions are newer in program order than the one of the grabline instructions that indicated that a store to one of the plurality of cache lines would cause an exception.

7. The microprocessor of claim 6, wherein if the store to the one of the plurality of cache lines would cause an architectural exception, the microcode stores the string to adjacent locations within the one of the plurality of cache lines until the architectural exception is generated.

8. The microprocessor of claim 7, wherein the architectural instruction specifies a string size of the string repeatedly stored to the adjacent locations in the memory, wherein the microcode stores the string to adjacent locations within the one of the plurality of cache lines via string size store instructions until the architectural exception is generated.

9. The microprocessor of claim 2, wherein the microcode is configured such that the grabline instructions temporally precede the store instructions to create a high likelihood that the microprocessor will have obtained ownership of the cache line before respective ones of the store instructions attempt to fill the cache line with the string.

10. The microprocessor of claim 2, wherein the architectural instruction is an x86 instruction set architecture repeat store string (REP STOS) instruction.

11. The microprocessor of claim 2, wherein the architectural instruction specifies a size of the string repeatedly stored to the adjacent locations in the memory, wherein each of the plurality of store instructions writes more bytes than the size of the string specified by architectural instruction.

12. The microprocessor of claim 2, wherein the microprocessor is configured to ensure that during execution of the architectural instruction, control is not transferred to system software until every one of the plurality of cache lines for which ownership was obtained by the microprocessor via a zero-beat read-invalidate bus transaction is filled with the string.

13. The microprocessor of claim 1, wherein the microprocessor is configured to forego initiating the transaction on the bus when executing the grabline instruction if microprocessor determines that the cache line has a write-combine memory trait.

14. The microprocessor of claim 1, wherein the microprocessor is further configured to forego initiating the transaction on the bus and to generate a non-architectural exception when executing the grabline instruction if the memory trait of the cache line is neither write-combine nor write-back.

15. The microprocessor of claim 1, wherein the microprocessor is further configured to forego initiating the transaction on the bus and to generate a non-architectural exception when executing the grabline instruction if the grabline instruction memory address misses in a translation lookaside buffer (TLB) of the microprocessor.

16. The microprocessor of claim 1, wherein the microprocessor is further configured to forego initiating the transaction on the bus and to generate a non-architectural exception when executing the grabline instruction if a page table walk has not yet been performed for a memory page that includes the cache line implicated by the grabline instruction memory address.

17. The microprocessor of claim 1, further comprising:
microcode, configured to implement an architectural instruction that instructs the microprocessor to move a string from a first region of the memory to a second region of the memory, wherein the second region of the memory collectively include a plurality of cache lines, wherein the microcode includes grabline instructions that specify memory addresses that implicate the plurality of cache lines, wherein the microcode also includes store instructions that fill the plurality of cache lines with a portion of the string.

18. The microprocessor of claim 17, wherein the architectural instruction is an x86 instruction set architecture repeat move string (REP MOVS) instruction.

19. A method to be performed by a microprocessor operatively coupled via a bus to a memory, the method comprising:
receiving a grabline instruction for execution, wherein the grabline instruction specifies a memory address that implicates a cache line of the memory;
determining whether a store to the cache line would cause an exception, in response to said receiving the grabline instruction for execution;
initiating a zero-beat read-invalidate transaction on the bus to obtain ownership of the cache line if a store to the cache line would not cause an exception; and
foregoing initiating the transaction on the bus if a store to the cache line would cause an exception.

20. The method of claim 19, further comprising:
decoding an architectural instruction that instructs the microprocessor to repeatedly store a string to adjacent locations in the memory specified by the architectural instruction, wherein the adjacent locations in the memory collectively include a plurality of cache lines; and
executing microcode of the microprocessor, in response to said decoding the architectural instruction, wherein the microcode includes grabline instructions that specify memory addresses that implicate the plurality of cache lines, wherein the microcode also includes store instructions that fill the plurality of cache lines with the string.

21. The method of claim 20, further comprising:
detecting a condition in which the microprocessor flushed before retiring one or more of the store instructions such that one or more of the plurality of cache lines for which ownership was obtained by the microprocessor via the zero-beat read-invalidate bus transaction was not filled with the string by the flushed store instructions.

22. The method of claim 21, further comprising:
filling with the string the one or more of the plurality of cache lines that were not filled with the string by the flushed store instructions, in response to said detecting the condition.

23. The method of claim 21, wherein the microprocessor flushed the one or more of the store instructions in response to one of the grabline instructions indicating that a store to one of the plurality of cache lines would cause an exception, wherein the flushed store instructions are newer in program order than the one of the grabline instructions that indicated that a store to one of the plurality of cache lines would cause an exception.

24. The method of claim 23, further comprising:
determining that the store to the one of the plurality of cache lines would cause the architectural exception; and
storing the string to adjacent locations within the one of the plurality of cache lines until an architectural exception is generated, in response to said determining that the store to the one of the plurality of cache lines would cause the architectural exception.

25. The method of claim 20, wherein the microcode is configured such that the grabline instructions temporally precede the store instructions to create a high likelihood that the microprocessor will have obtained ownership of the cache line before respective ones of the store instructions attempt to fill the cache line with the string.

26. The method of claim 20, wherein the architectural instruction is an x86 instruction set architecture repeat store string (REP STOS) instruction.

27. The method of claim 20, further comprising:
ensuring that during execution of the architectural instruction, control is not transferred to system software until every one of the plurality of cache lines for which ownership was obtained by the microprocessor via a zero-beat read-invalidate bus transaction is filled with the string.

28. The method of claim 19, further comprising:
foregoing initiating the transaction on the bus when executing the grabline instruction if the cache line has a write-combine memory trait.

29. The method of claim 19, further comprising:
foregoing initiating the transaction on the bus and generating a non-architectural exception when executing the grabline instruction if the memory trait of the cache line is neither write-combine nor write-back.

30. The method of claim 19, further comprising:
foregoing initiating the transaction on the bus and generating a non-architectural exception when executing the grabline instruction if the grabline instruction memory address misses in a translation lookaside buffer (TLB) of the microprocessor.

31. The method of claim 19, further comprising:
foregoing initiating the transaction on the bus and generating a non-architectural exception when executing the grabline instruction if a page table walk has not yet been performed for a memory page that includes the cache line implicated by the grabline instruction memory address.

32. The method of claim 19, further comprising:
decoding an architectural instruction that instructs the microprocessor to move a string from a first region of the memory to a second region of the memory, wherein the second region of the memory collectively include a plurality of cache lines; and executing microcode of the microprocessor, in response to said decoding the architectural instruction, wherein the microcode includes grabline instructions that specify memory addresses that implicate the plurality of cache lines, wherein the microcode also includes store instructions that fill the plurality of cache lines with a portion of the string.

33. The method of claim 32, wherein the architectural instruction is an x86 instruction set architecture repeat move string (REP MOVS) instruction.

34. A computer program product for use with a computing device, the computer program product comprising:

a non-transitory computer usable storage medium, having computer readable program code embodied in said medium, for specifying a microprocessor, operatively coupled via a bus to a memory, the computer readable program code comprising:

first program code for specifying a cache memory; and second program code for specifying a grabline instruction, that specifies a memory address that implicates a cache line of the memory, wherein the grabline instruction instructs the microprocessor to initiate a zero-beat read-invalidate transaction on the bus to obtain ownership of the cache line;

wherein the microprocessor is configured to forego initiating the transaction on the bus when executing the grabline instruction if the microprocessor determines that a store to the cache line would cause an exception.

* * * * *